United States Patent [19]

Lanterman

[11] 4,417,238
[45] Nov. 22, 1983

[54] ALARM MODIFICATION FOR METEOROLOGICAL INSTRUMENT

[75] Inventor: Beryl A. Lanterman, Timonium, Md.

[73] Assignee: The Bendix Corporation, Southfield, Mich.

[21] Appl. No.: 368,796

[22] Filed: Apr. 16, 1982

Related U.S. Application Data

[63] Continuation of Ser. No. 219,082, Dec. 22, 1980, abandoned.

[51] Int. Cl.³ ............................................. G08B 21/00
[52] U.S. Cl. .................................... 340/688; 250/215; 250/231 R; 340/601; 346/17
[58] Field of Search ................. 340/688, 601; 346/17; 250/231 R, 215; 73/DIG. 11, 170 R, 336.5; 374/186

[56] References Cited

U.S. PATENT DOCUMENTS 2,169,465 8/1939 Hadley ................................ 250/215
2,903,321 9/1959 Maude .................................. 346/17
3,249,759 5/1966 Sendro ................................ 340/688
4,300,548 11/1981 Jones ................................ 250/231 R
4,327,583 5/1982 Fujimoto ............................ 340/601

*Primary Examiner*—Glen R. Swann, III
*Attorney, Agent, or Firm*—Bruce L. Lamb; W. G. Christoforo

[57] ABSTRACT

An alarm modification kit for adding an electrical alarm signal feature to a mechanical recording type meterorological instrument. The kit includes a counterbalanced shutter arm adapted to be secured to the output shaft of the instrument which carries the recorder pen without disturbing the output shaft in its mountings. The free end of the shutter arm is T-shaped with a notch located centrally therein. A U-shaped photo source-sensor assembly is adjustably positioned astride the free end of the shutter arm so that the cross member of the arm moves transversely between the legs of the source-sensor, preventing generation of an electrical signal therefrom until the notch of the shutter arm is moved into alignment with the source-sensor.

5 Claims, 4 Drawing Figures

ALARM MODIFICATION FOR METEOROLOGICAL INSTRUMENT

CROSS-REFERENCE TO A RELATED APPLICATION

This application is a continuation of application Ser. No. 219,082, filed Dec. 22, 1980 now abandoned.

BACKGROUND OF THE INVENTION

The present invention relates to atmospheric measuring instruments. More particularly, it relates to an attachment for mechanical recording type meteorological instruments which permits conversion of instruments originally constructed only to record a measurement to an instrument which will also provide an electrical alarm signal whenever a predetermined limit of the measurement is reached.

A typical recording instrument to which the present invention is applicable is the hygrothermograph. This instrument comprises a revolving drum driven by a clockwork mechanism. A recording chart having the upper portion divided into degrees of temperature and the lower portion divided into percentages of relative humidity is mounted on the drum to be carried beneath a pair of pen arms, one of which is controlled by a temperature responsive sensor and the other of which is controlled by a sensor responsive to relative humidity. Such an instrument provides a continuous record, over a period of time dependent upon the drum speed, of the temperature and relative humidity of the air to which the instrument is exposed. The instrument is entirely mechanical in operation and provides no electrical signal indicative of the conditions being measured. There are many hundreds of recording instruments of the general design of the hygrothermograph in use for monitoring air conditions in living and working quarters, museums, factories, warehouses and the like. If it is necessary to control the condition of the air within certain limits it is necessary to maintain a more or less continuous watch on the instrument indication so that appropriate adjustments can be made in the heating or airconditioning system of the building in which the instrument is located. Often such buildings are left unattended for extended periods and in the absence of proper monitoring, conditions can get out of hand and extensive damage can result.

The inclusion of limit switches for actuating electrical alarms is a relatively straight forward matter if such a requirement is considered from the beginning of the design of an instrument. When it is desired to add an alarm feature to instruments of established design and to do so in a manner which will not require factory rebuilding of the instrument, the provision of an alarm feature becomes more difficult. A satisfactory assembly for adding an alarm to existing instruments is one which can be installed by the user without the need for special tools, one which will not affect the accuracy of the instrument nor interfere with its basic function of measuring and recording a particular physical quality or condition, one which provides both high and low alarm set points, and one in which the alarm set points can be conveniently set by the user.

It is an important object of the invention to provide an assembly for retrofitting instruments of established design which will add thereto the capability of generating electrical alarm signals to provide an alert at a remote location of out of limit conditions at the instrument location or for other purposes for which such signals may be used.

It is another important object of the invention to provide a retrofit assembly for adding an alarm feature to instruments lacking such a feature at a fraction of the cost of replacing the instrument with one which includes an alarm feature.

It is still another object of the invention to provide such a retrofit assembly for adding an alarm feature to instruments of established design which is readily installed, does not alter the accuracy of the instrument, and which includes adjustable high and low alarm set points.

SUMMARY OF THE INVENTION

Briefly, the modification kit of the invention comprises a T-shaped shutter arm attachable to the pen drive shaft of a recording meteorological instrument without removal of the shaft from the instrument or disturbance of the sensor and linkage mechanism which operates the shaft. A photo optical transistor sensing device formed as a generally U-shaped module is adjustably mounted adjacent the cross member of the shutter arm so that the cross member extends transversely between the legs of the sensor module. One of the module legs contains a light emitting diode and the other leg contains a photosensitive transistor facing the diode. The shutter arm cross member normally prevents light directed from the diode toward the photo transistor from reaching the transistor and generating an alarm signal. A notch formed in the cross member will permit such light transmission and generation of alarm signal, however, when the shutter arm is moved to a position aligning the notch with the module legs. That position is, of course, the alarm trip point which may be selected to occur at any point within the indicating range of the instrument by appropriate adjustment of the relative positions of the shutter arm and sensor modules.

DETAILED DESCRIPTION OF THE INVENTION

Figure 1:
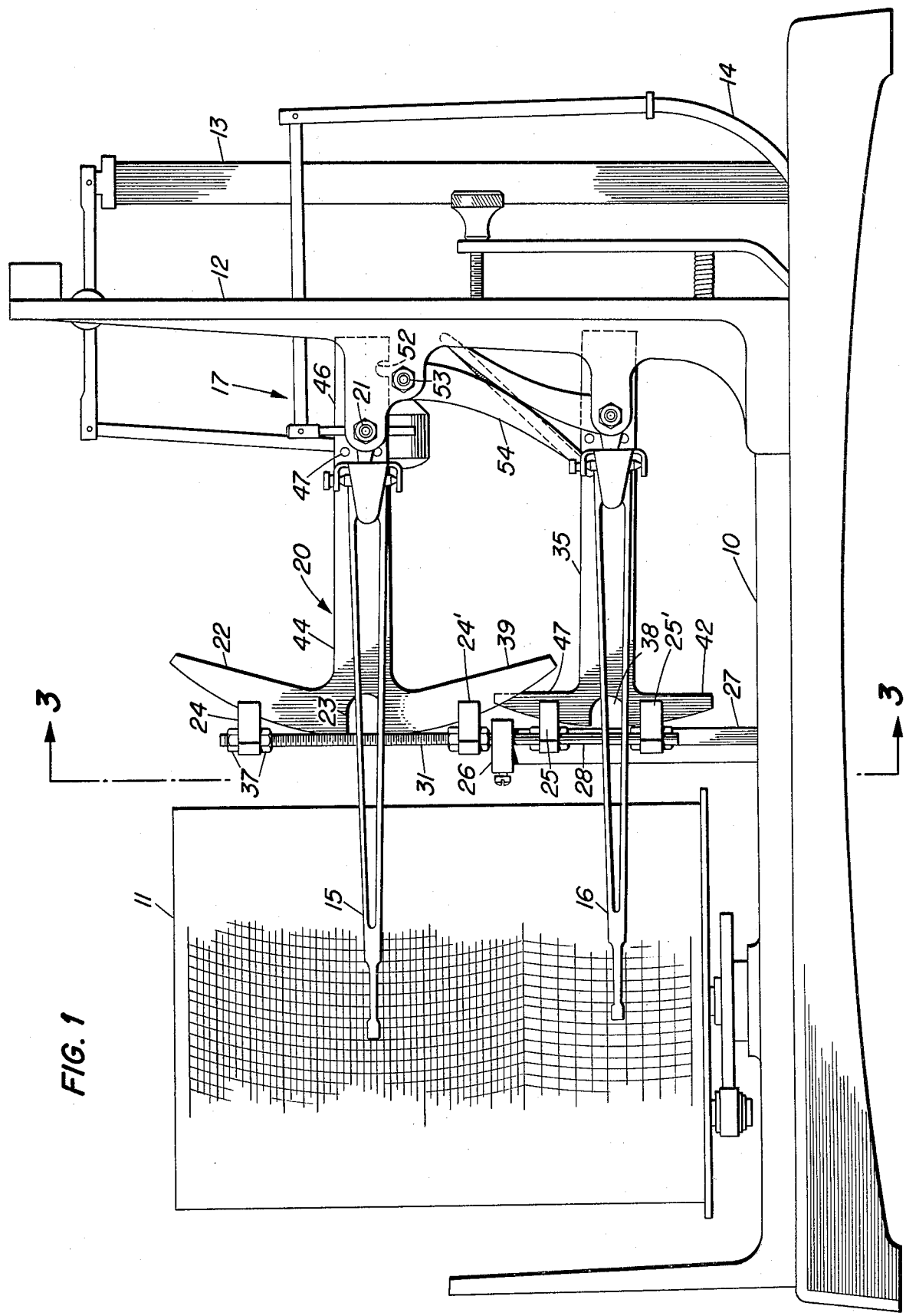
FIG. 1 is an elevation showing a hygrothermograph instrument modified in accordance with the invention.
Figure 2:
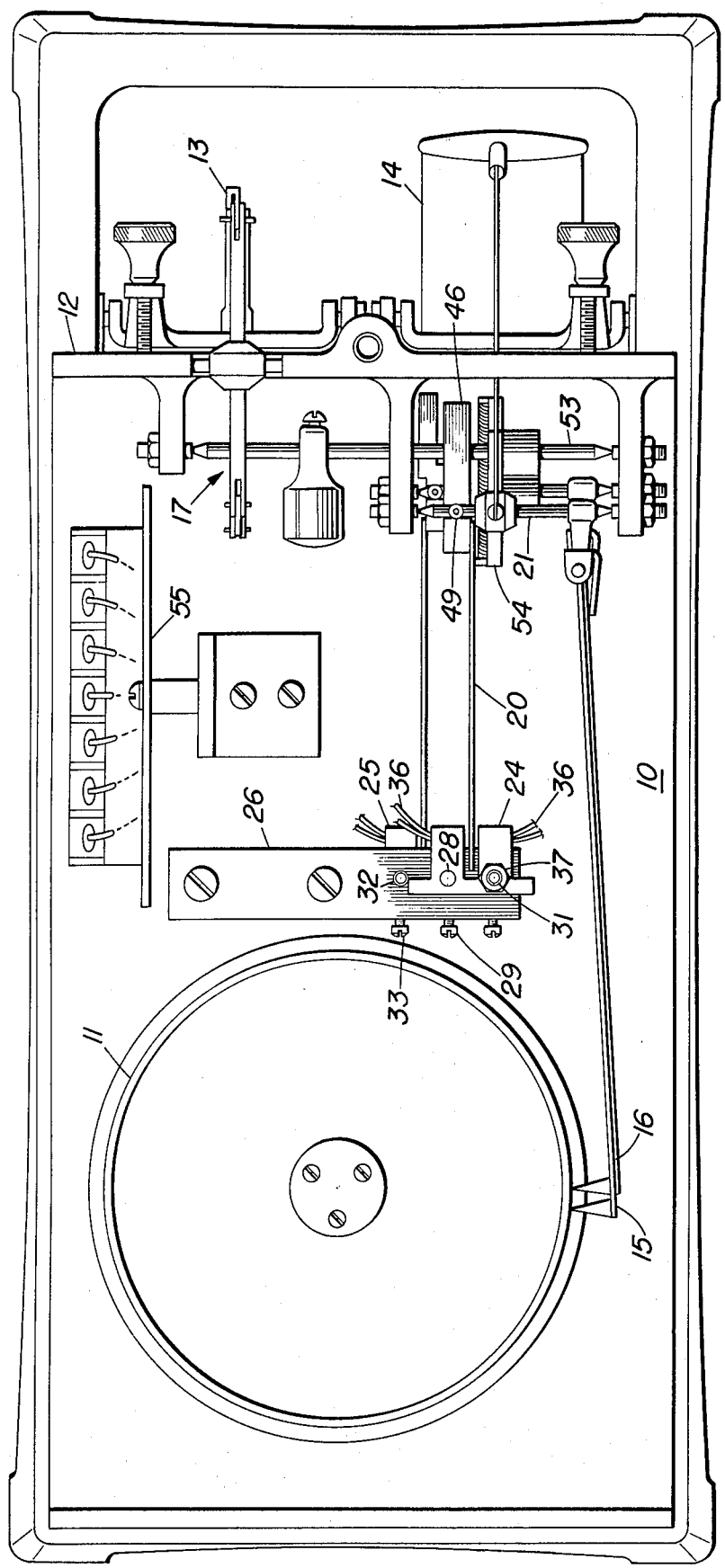
FIG. 2 is a plan of the modified instrument of FIG. 1.

Referring to FIG. 1 a hygrothermograph is shown with the modification kit of the invention fitted thereto. The hygrothermograph comprises a base 10 with a clockwork driven drum 11 mounted thereon and with a vertical wall 12 attached thereto which supports a humidity sensor 13, a temperature sensor 14, a temperature recording pen 15, a humidity recording pen 16 and linkage mechanisms, shown generally at 17, coupling the temperature and humidity sensors to their respective recording pens. A T-shaped shutter arm 20 is attached by means later to be described to the shaft 21, best seen in FIG. 2, upon which the temperature recording pen 15 is mounted. The cross member 22 of arm 20 is arcuate and carries a notch 23 at the center to permit passage of light from a light emitting diode source to a photo transistor, both of which are mounted in a sensor module 24, best seen in FIG. 2.

Modules 24, 24', 25 and 25' are commercially available components supplied, for example, by Texas Instruments, Inc. as Source and Sensor Assembly type TIL 138. The body of the module is generally U-shaped with one leg containing a light emitting diode and with the other leg containing a photo transistor. The base of the U contains mounting holes and electrical leads 36 extend from the legs for supplying energizing voltage to the diode and for receiving signal output from the transistor.

Figure 3:
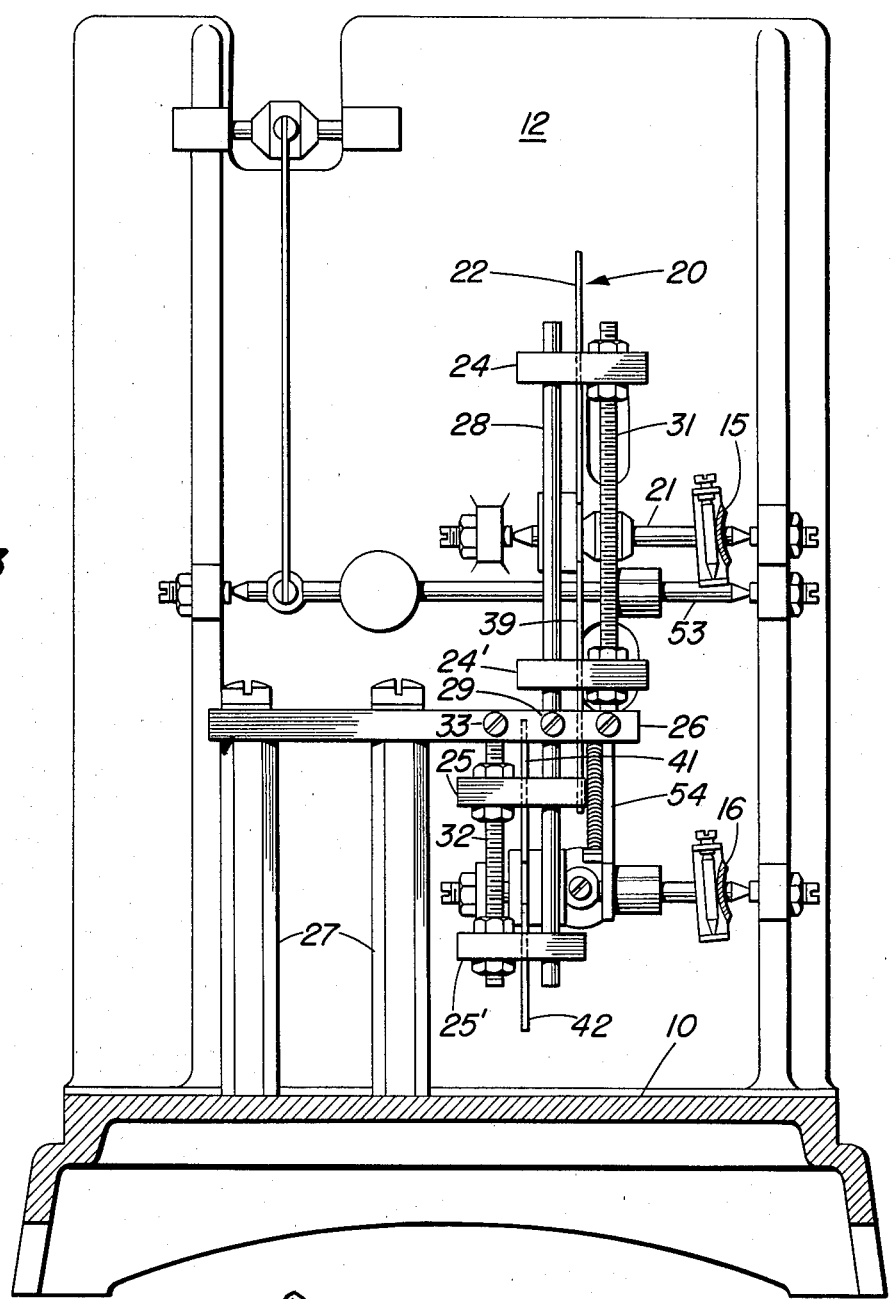
FIG. 3 is a section taken along the line 3—3 of FIG. 1.

Sensor modules 24, 24', 25 and 25', of identical construction, are mounted for vertical adjustment by means best seen in FIG. 3. A horizontally extending bar 26 is secured to and spaced from base 10 by a pair of standoffs 27. A smooth shaft 28 extends vertically through bar 26 and is fastened thereto by a set screw 29. Threaded shafts 31 and 32 are attached to bar 26 by set screws 33 to extend above and below bar 26 parallel to shaft 28 and on opposite sides thereof to provide clearance between the upper shutter arm 20 and the lower shutter arm 35.

Modules 24, 24', 25 and 25' are adjustable in vertical position and spacing by manipulation of mounting nuts 37 threaded on shafts 31 and 32. As best seen in FIG. 1, the position of the uppermost module is adjusted to the level of notch 23 when temperature pen 15 indicates that temperature at which the high temperature alarm signal is to be given. The position of module 24' is adjusted to the level of notch 23 when temperature pen 15 indicates that temperature at which the low temperature alarm signal is to be given. Similarly, the positions of the lower pair of modules 25 and 25' are adjusted to the levels of notch 38 when the humidity pen 16 indicates, respectively, the humidity at which the high humidity alarm signal is to be given and the humidity at which the low humidity alarm signal is to be given. For travel of the temperature pen 15, and corresponding movement of shutter arm 20, between the values of the high alarm point and the low alarm point, upper cross member 22 of arm 20 obstructs passage of light from the diode source to the transistor sensor in module 24 and prevents the generation of signal output therefrom while the lower cross member 39 of arm 20 performs a similar function in module 24'. Upper cross member 41 and lower cross member 42 of shutter arm 35 similarly prevent the generation of signals from modules 25 and 25' during travel of humidity pen 16 between the values of the high and low humidity alarm points.

Figure 4:
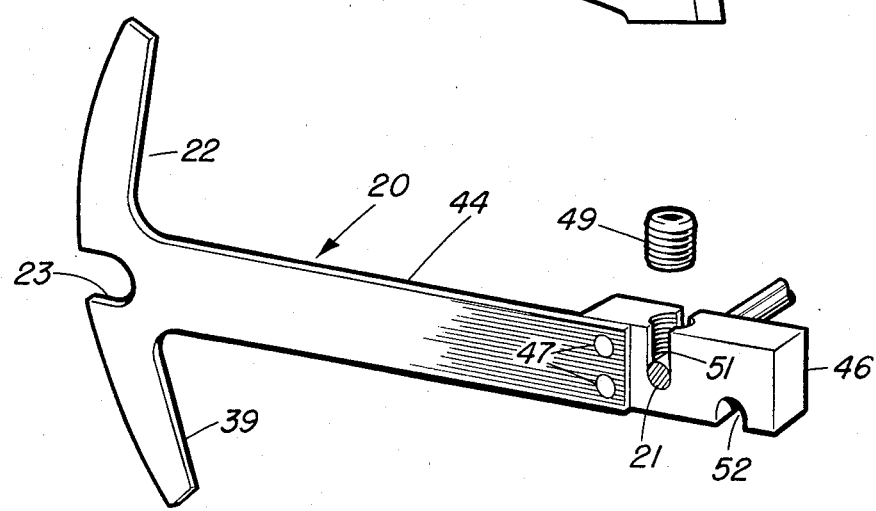
FIG. 4 is an elevation of a shutter arm used in the invention.

FIG. 4 illustrates the construction of shutter arm 20 which permits its attachment to shaft 21 without disturbance of the mechanism or calibration of the instrument. The outer leg 44 and cross members 22 and 39 of the shutter arm are formed as a unitary piece from thin sheet stock. The inner end of leg 44 is attached to a hub block 46 by rivets 47. On a line passing vertically through the center of gravity of the arm and hub assembly a hole is drilled and tapped for a set screw 49 having a root diameter at least as large and preferably larger than the diameter of shaft 21. A slot 51 having a width equal to the diameter of shaft 21 and a bottom radius conforming thereto is milled transversely through block 46 so as to be centered along the axis of set screw 49. The depth of slot 51 is such that when shaft 21 is bottomed therein and secured by set screw 49, the axis of shaft 21 passes through the center of gravity of the shutter arm assembly. For the Bendix Model 594 Hygrothermograph for which the described embodiment of the invention is designed, a slot 52 is provided at the lower inner end of block 46 for clearance of shaft 53 when shutter arm 20 is rotated to position corresponding to maximum temperature. Shutter arm 35 is substantially similar in construction to shutter arm 20 except that it is necessary to offset transversely the inner portion of the hub block thereof, corresponding to block 46, to provide clearance of the humidity indicator compensating cam mechanism 54 during travel of arm 35.

The wiring harness and electronic circuit board required for operation of the invention have not been shown in the drawings for purposes of clarity. The circuit board, upon which are mounted transistor amplifier and switching relay circuits of conventional design, may be conveniently located in a vertical position as shown at 55 in FIG. 2. Connecting leads are readily routed from the circuit board to the sensor terminals 36 in a manner which does not interfere with movement of the instrument or alarm mechanisms.

The invention claimed is:

1. A modification kit for adding an electrical alarm feature to an instrument originally designed to provide only visual indication of a quantity being measured, said instrument including a sensor producing a motion in response to changes in the measured quantity, an output shaft, a linkage coupling motion of said sensor to said shaft and an indicating arm coupled to said shaft, said arm showing the value of the measured quantity, said modification kit comprising;

an elongated shutter arm one end of which defines an area the major portion of which is opaque and a minor portion of which is transparent;

means for securing the other end of said shutter arm to said instrument output shaft without disturbing said shaft in its mountings, said shutter arm extending generally parallel with said instrument indicating arm, said securing means including a hub member having a slot therein permitting said hub member to be fitted over said output shaft, means on said hub member for securing said output shaft in said slot, and means securing said hub member to said other end of said shutter arm;

a photo source-sensor including a light source and a photo sensor mounted in a unitary body with said light source separated from and facing said photo sensor; and means including a shaft extending parallel to the plane of motion of said shutter arm and means for securing said sourcesensor to said shaft at a selectable position along said shaft for adjustably supporting said photo source-sensor adjacent said shutter arm to permit motion of said shutter arm within the space separating said light source from said photo sensor, whereby said major opaque portion of said shutter prevents light transmission from said source to said photo sensor during movement of said output shaft for which no alarm signal is to be generated and further movement of said shaft to the alarm signal set point carries said minor transparent area of said shutter arm into the space separating said light source from said photo sensor permitting light transmission therebetween and causing said photo sensor to generate an electrical output signal.

2. An alarm signal modification kit as claimed in claim 1 with additionally a second photo source-sensor and means for securing said second source-sensor to said supporting means shaft at a selectable position spaced from the position of said source-sensor first mentioned.

3. An alarm signal modification kit as claimed in claim 2 wherein said shutter arm is generally T-shaped in form with the cross member of the T constituting said major opaque area and with a notch in said cross member defining said minor transparent area.

4. An alarm signal modification kit as claimed in claim 1 wherein said hub member is of greater mass per unit length than is said shutter arm and wherein said slot is located substantially at the center of gravity of said hub member and said attached shutter arm.

5. An alarm signal modification kit as claimed in claim 4 wherein said means for securing said output shaft in said slot comprises a set screw threaded into said slot and bearing on said shaft.

* * * * *